United States Patent
Mogilevsky

(10) Patent No.: US 9,140,493 B2
(45) Date of Patent: Sep. 22, 2015

(54) APPARATUS AND PROCESS FOR CONCENTRATING A SEPARABLE COMPONENT OF A SLURRY

(71) Applicant: Margalit Mogilevsky, Toronto (CA)

(72) Inventor: Mikhail (Michael) Mogilevsky, Toronto (CA)

(73) Assignee: Margalit Mogilevsky, Thornhill, Ontario (CA)

( * ) Notice: Subject to any disclaimer, the term of this patent is extended or adjusted under 35 U.S.C. 154(b) by 207 days.

(21) Appl. No.: 13/896,627

(22) Filed: May 17, 2013

(65) Prior Publication Data

US 2013/0305558 A1    Nov. 21, 2013

Related U.S. Application Data

(60) Provisional application No. 61/648,877, filed on May 18, 2012.

(51) Int. Cl.

| | | |
|---|---|---|
| *F26B 11/02* | (2006.01) | |
| *F26B 5/00* | (2006.01) | |
| *B01D 33/03* | (2006.01) | |
| *B01D 9/00* | (2006.01) | |
| *B01D 9/04* | (2006.01) | |
| *C02F 11/12* | (2006.01) | |
| *C02F 1/22* | (2006.01) | |

(52) U.S. Cl.
CPC ............... *F26B 5/00* (2013.01); *B01D 9/0081* (2013.01); *B01D 9/04* (2013.01); *B01D 33/0338* (2013.01); *C02F 11/12* (2013.01); *C02F 1/22* (2013.01)

(58) Field of Classification Search
CPC .......... F26B 11/00; F26B 11/02; F26B 21/00; F26B 17/00; F26B 17/12; F26B 17/14; F26B 17/1416; B01D 33/00; B01D 33/06; B01D 33/067; F25B 1/00
USPC .............. 34/401, 413, 497, 90, 174; 210/320, 210/374, 781; 62/123
See application file for complete search history.

(56) References Cited

U.S. PATENT DOCUMENTS

| | | | |
|---|---|---|---|
| 2,751,043 A | 6/1956 | Herman et al. | |
| 2,984,992 A | 5/1961 | Wenzelberger | |
| 3,087,255 A | * | 4/1963 | Morrow .......................... 34/167 |

(Continued)

FOREIGN PATENT DOCUMENTS

| | | |
|---|---|---|
| DE | 3407284 | 9/1985 |
| EP | 0443385 | 8/1991 |

(Continued)

OTHER PUBLICATIONS

Extended European Search Report for EP13168218.9, dated Sep. 26, 2013.

*Primary Examiner* — Stephen M Gravini

(57) ABSTRACT

Methods and apparatuses are provided for separating a slurry mixture into its constituent melted liquid form and solid frozen form. This involves forcing the slurry mixture through an inlet into a vessel and through the vessel to an opening, wherein the vessel comprises a plurality of perforations dimensioned to receive a liquid flow from the slurry mixture to dry the slurry mixture; vibrating the vessel and the slurry mixture within the vessel to shake the material in the melted liquid form out through the plurality of perforations to dry the slurry mixture; and, extracting the dried slurry mixture from the opening.

15 Claims, 2 Drawing Sheets

(56) References Cited

U.S. PATENT DOCUMENTS

| | | | |
|---|---|---|---|
| 3,132,929 A * | 5/1964 | Thuse | 34/77 |
| 3,545,093 A * | 12/1970 | Forster | 34/262 |
| 3,885,933 A | 5/1975 | Putney | |
| 4,112,702 A | 9/1978 | Smirnov | |
| 4,517,806 A | 5/1985 | Korzonas | |
| 4,543,085 A | 9/1985 | Funabashi | |
| 4,601,113 A * | 7/1986 | Draper et al. | 34/359 |
| 4,617,744 A * | 10/1986 | Siddoway et al. | 34/168 |
| 4,735,781 A | 4/1988 | Thijssen | |
| 4,830,645 A | 5/1989 | Ghodzizadeh et al. | |
| 5,207,933 A * | 5/1993 | Trinh et al. | 510/517 |
| 5,536,421 A * | 7/1996 | Hartman et al. | 8/137 |
| 6,249,989 B1 * | 6/2001 | Conochie et al. | 34/337 |
| 6,461,523 B1 | 10/2002 | Greenrose | |
| 7,089,681 B2 * | 8/2006 | Herbert et al. | 34/92 |
| 8,003,059 B2 | 8/2011 | Jachuck | |
| 8,245,521 B2 | 8/2012 | Sarkar et al. | |
| 8,252,120 B2 | 8/2012 | Nordhoff et al. | |
| 2002/0030024 A1 | 3/2002 | Leung et al. | |
| 2007/0215560 A1 | 9/2007 | Whisler | |
| 2010/0050458 A1 * | 3/2010 | Aaron et al. | 34/59 |

FOREIGN PATENT DOCUMENTS

| | | |
|---|---|---|
| EP | 1558412 B1 | 12/2008 |
| GB | 739825 | 11/1955 |
| WO | 9715372 | 5/1997 |
| WO | 2008155640 | 12/2008 |
| WO | 2012174588 A1 | 12/2012 |

* cited by examiner

APPARATUS AND PROCESS FOR CONCENTRATING A SEPARABLE COMPONENT OF A SLURRY

PRIORITY CLAIM

This application claims priority to U.S. Provisional Patent Application No. 61/648,877, filed on May 18, 2012. The content of this application is being incorporated herein by reference in its entirety.

FIELD

The described embodiments relate to apparatuses and processes for concentrating a separable component of a slurry.

INTRODUCTION

Concentration of solutions or suspensions is a common process used in many industries. Common techniques include evaporation processes and freeze concentration processes, each of these processes having respective advantages and disadvantages. In the field of freeze concentration of aqueous solutions, one approach to concentrating an aqueous solution involves scraping ice crystals off of heat exchanger surfaces on which the ice crystals form, and then mixing the scraped off ice crystals with an aqueous solution to form a slurry ice. A different approach avoids ice scraping by supercooling an aqueous solution to below its freezing point (see U.S. Pat. No. 6,305,178). To produce a concentrated product, each of these approaches necessitates separating the ice from the solution. There remains a need for approaches that efficiently separate, handle and recover a separable component of a slurry for use in further applications, or for disposal in an environmentally safe manner.

DRAWINGS

Figure 1:
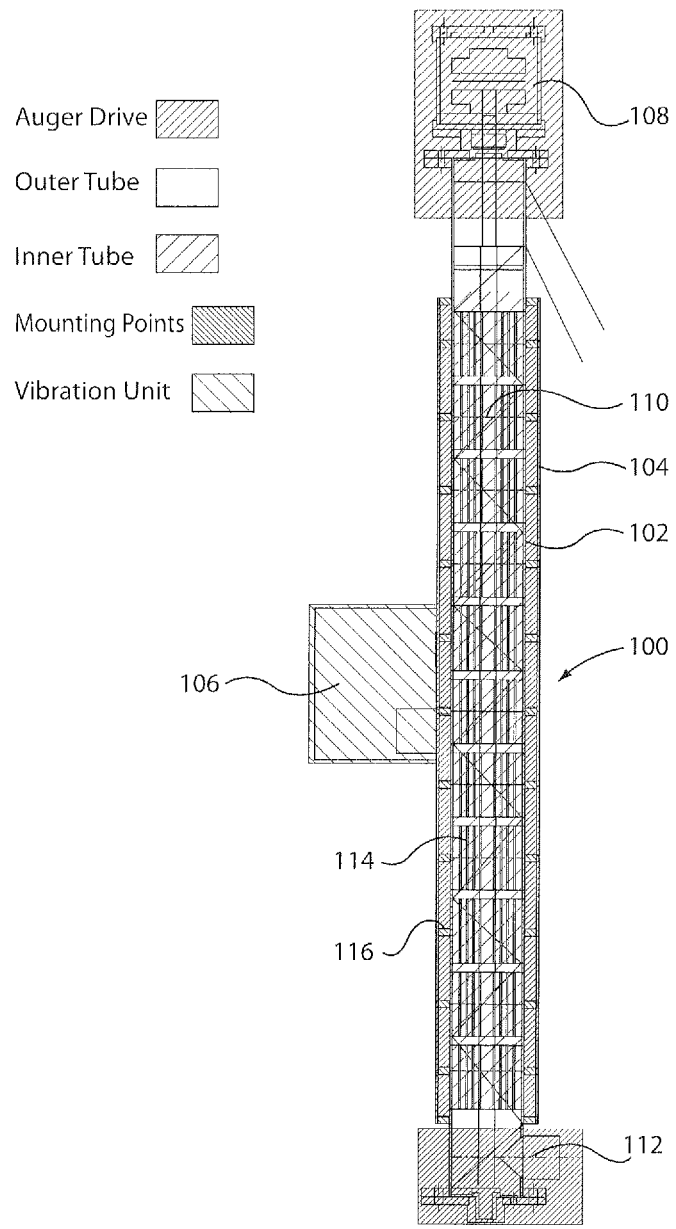
Figure 2:
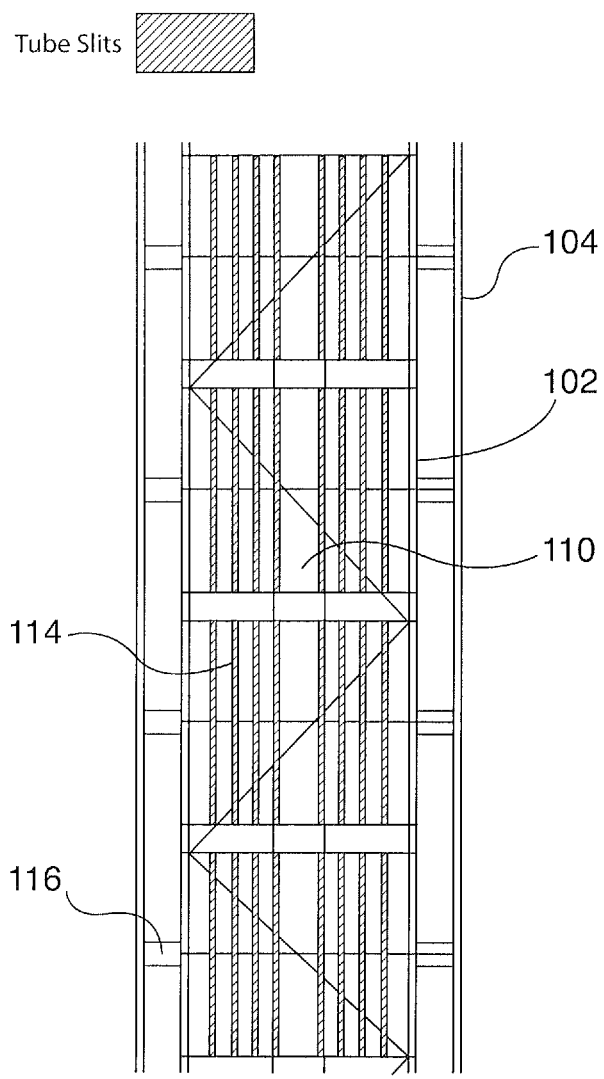

An embodiment of the present invention will now be discussed in detail with reference to the drawings, in which:

FIG. 1 is a sectional view of an apparatus that can be used to concentrate a separable component of a slurry in accordance with an embodiment of the present disclosure; and FIG. 2 is a partial view of the sectional view illustrated in FIG. 1.

| Drawings-Reference Numerals | | | |
|---|---|---|---|
| 100 | vessel assembly | 110 | auger |
| 102 | inner vessel | 112 | inlet |
| 104 | outer vessel | 114 | perforations |
| 106 | vibrating mechanism | 116 | mounting points |
| 108 | auger drive mechanism | | |

DESCRIPTION OF VARIOUS EMBODIMENTS

A slurry is a semiliquid mixture generally comprising a liquid and particles (for example, cement, clay, coal, dust, ice etc.) that are suspended in the liquid. The various embodiments described herein generally relate to apparatuses and processes for handling a slurry in the course of concentrating a separable component from the slurry. The desired output of a separated slurry mixture may be the liquid component or the solid component of the slurry mixture. For example, ice particles (the solid component of a slurry mixture) may be the desired output in a snow-making application. Conversely, ice particles may be an unwanted waste-product in applications in which a concentrated liquid (the liquid component of a slurry mixture) is the desired output. Such applications include recovered aircraft de-icing fluid, or concentrated alcohol and fruit juices, for example. The dilute liquid component of the slurry mixture may be concentrated by freezing and separating out the frozen water content (the separated ice particles may simply be discarded). For example, an aircraft de-icing fluid such as glycol typically becomes diluted upon contact with snow and water present on the aircraft being sprayed with the de-icing fluid. The slurry mixture containing the diluted de-icing fluid can be collected and then concentrated by freezing; the unwanted water content (in the form of ice particles) can be separated and discarded and the remaining concentrated de-icing fluid reused.

Reference is made to FIG. 1 and FIG. 2, which illustrate various parts of one embodiment of the invention. The embodiment may be used to concentrate a separable component of various slurries. In one embodiment, the slurry can be slurry ice comprising a material in a melted liquid form and in a solid frozen form. Slurry ice generally comprises a mixture of water (which may contain various agents that can lower the freezing point, such as salt brines or alcohols, for example) and ice crystals. In a further embodiment, the separable component of the slurry ice can be ice.

The illustrated embodiment can comprise vessel assembly 100. In one embodiment, vessel assembly 100 can be supported with standard isolation mounts in a frame.

Vessel assembly 100 may comprise inner vessel 102 and outer vessel 104. Both inner vessel 102 and outer vessel 104 can be substantially vertically positioned tubes—supports (not shown) can be provided to maintain the inner vessel 102 and outer vessel 104 in a substantially vertical orientation. In one embodiment, inner vessel 102 can be positioned within outer vessel 104. Alternatively, in other embodiments, inner vessel 102 can be positioned only partially within outer vessel 104, such that at least some portions of inner vessel 102 are not within outer vessel 104. In a further embodiment, inner vessel 102 and outer vessel 104 can be joined together using mounts at a plurality of mounting points 116.

Normal separation vessels (such as columns, for example) can be joined at the top/bottom or a few other points. However, vibrating the vessels may cause additional load stress on mounting points. A shifting load as well as resonance of the vessels and contents in time may also increase stresses on mounting points.

The location or number of mounting points 116 may be varied to offset these additional stresses while minimizing interference with water and ice flow.

Further, the mounts at mounting points 116 can be designed to have sufficient strength to offset these additional stresses. In one embodiment, the mounts can further be designed for minimum interference with the water and ice flow; this can promote free flow of water and residual ice crystals in outer vessel 104 and can impede accumulation and blockage (which could freeze up the unit). In one embodiment, the design may involve minimizing the surface area of the mounts relative to the open area between inner vessel 102 and outer vessel 104, thereby increasing the available flow area. In a further embodiment, the design can involve minimizing the horizontal surfaces of the mounts where water and ice crystals may collect despite the vibration. Such designs may allow the mounts to shed rather than accumulate ice and water that comes into contact with them. For example, each of the mounts at mounting points 116 may be cylindrical, or may have a tapered upward facing portion, such that the mounts 116 do not provide a large horizontal surface on which ice can accumulate. More generally, each of the mounts at mounting points 116 may comprise a curved or inclined upward facing surface The concentric wall of inner vessel 102 can contain a plurality of perforations 114. The size and shape of perforations 114 is such that water can pass from inner vessel 102 to outer vessel 104 (more specifically such that water can pass to a volume outside the inner vessel and enclosed by the outer vessel 104) through perforations 114 whereas a majority of a coalescing ice mass can remain in inner vessel 102. Furthermore, the size and shape of perforations 114 may be varied according to the slurry particle size desired. For example, smaller perforations 114 may be used to produce very fine ice slurry crystals while larger perforations 114 may be used to produce larger ice slurry crystals. In one embodiment, perforations 114 can be in the shape of vertically elongated slits; using such a shape may provide increased separation area (by increasing the open surface area of the wall of inner vessel 102) while retaining the structural integrity of inner vessel 102; such a shape may also decrease points of re-entry for extracted water as it falls or runs down between inner vessel 102 and outer vessel 104. According to other embodiments, perforations 114 can be in the shape of horizontal or diagonal oriented slits; using such shapes may create a shear face orthogonal to auger 110, or create a spiral motion as the slurry mixture passes through inner vessel 102, for example. According to yet other embodiments, perforations 114 can be in the shape of elongated slits that are tapered in width, so that particles that are blocked from flowing through at the narrow end of the taper may flow through the wider end of the taper as a result of vibration being applied to inner vessel 102 causing movement of the particles towards the wider end of the taper.

In a further embodiment, the size or shape of perforations 114 may vary depending on where along the vertical axis of inner vessel 102 a perforation is located; this may further optimize separation. For example, according to some embodiments, the size of the perforations 114 may be smaller toward the bottom of the inner vessel 102, as the slurry mixture may contain more water there and smaller perforations 114 suffice to receive the water from this wetter slurry mixture, and may increase toward the top of the inner vessel 102, as the slurry mixture may contain less water there, and the larger perforations 114 may be required to allow the water from this dryer slurry mixture to escape. Alternatively, in some embodiments, the change in the dimension of the perforations 114 may be reversed, such that the size of the perforations 114 is larger at the bottom of the inner vessel 102 and smaller at the top. According to other embodiments, each perforation may be V-shaped, such that it is narrower at the bottom and increases in width towards the top. Alternatively, this orientation of the V-shaped perforations 114 could be reversed, such that each perforation is narrower at the top and increases in width toward the bottom. According to still further embodiments, the width of the perforations 114 may vary from 0.005 inches and 0.06 inches, and the length of the perforations 114 may vary from 0.005 inches to up to several inches in length (for example, the perforations 114 may be 5 inches long). V-shaped slots, or more generally tapered slots, can be particularly advantageous when vibration is applied to the inner vessel 102 as described above, as a particle jammed at a point in the slot can vibrate along to the wider part of the slot and pass through.

The embodiment can further comprise inlet 112, which can be connected to the bottom of inner vessel 102. In a further embodiment, a pumping mechanism (not shown) can be connected to inlet 112. The pumping mechanism can control the level of pressure of the slurry mixture in inner vessel 102 by forcing the slurry mixture through inlet 112 and inner vessel 102 at a desired flow rate. Furthermore, the pumping mechanism may operate to continuously monitor and vary the level of pressure of the slurry mixture in inner vessel 102 so that a level of pressure sufficient to force water out of the slurry mixture through perforations 114 is maintained. The pumping mechanism may vary pressure in response to the operation of other components of the apparatus, such as auger 110, described below. For example, when auger 110 operates to remove a quantity of the slurry mixture from inner vessel 102, a corresponding drop in the level of pressure of the slurry mixture may occur causing the pumping mechanism to increase the flow of slurry mixture entering inner vessel 102 via inlet 112. In a further embodiment, the pumping mechanism may send instructions to other components of the apparatus so that the pressure of the slurry mixture inside inner vessel 102 may be maintained at a certain level. For example, the pumping mechanism may instruct the frequency controller associated with vibrating mechanism 106 (described below) to increase or decrease the frequency of the vibration applied to inner vessel 102 so that the pressure of the slurry mixture inside inner vessel 102 will increase or decrease to some desired level of pressure. Optionally, pressure monitors (not shown) can be provided inside inner vessel 102 to monitor the internal pressure at various points along the length of the inner vessel 102.

The embodiment can further comprise vibrating mechanism 106. Vibrating mechanism 106 may comprise a motor unit designed to drive vibrating mechanism 106. In one embodiment, vibrating mechanism 106 is of a pneumatic type, but it can also be one of many vibrators that are commercially available. Alternatively, vibrating mechanism 106 may be electric or hydraulic. In other embodiments, vibrating mechanism 106 may comprise a frequency controller for controlling the frequency of the vibration. Optionally, the frequency of the vibrating mechanism 106 can be adjusted to find an effective frequency for enhancing water flow through the perforations 114, impeding ice buildup within the inner vessel 102 or perforations 114, or enhancing slurry and ice flow through inner vessel 102. This frequency may be a resonance frequency of the inner vessel 102 or the vessel assembly 100 more generally. As described above, a pumping mechanism that operates to pass a slurry mixture into inner vessel 102 via inlet 112 may respond to the operation of other components of the apparatus. In an embodiment, vibrating mechanism 106 may cause a level of vibration sufficient to cause the pressure of the slurry mixture inside inner vessel 102 to decrease (by causing inner vessel 102 to vibrate, vibrating mechanism 106 may cause a quantity of the of the slurry mixture, such as material in a melted liquid form, within inner vessel 102 to be shaken out through perforations 114) and the pumping mechanism may respond by increasing the rate at which the slurry mixture is passed into inner vessel 102. In a further embodiment, the pumping mechanism may send instructions to the frequency controller associated with vibrating mechanism 106 to adjust the frequency of vibration and thereby change the level of pressure of the slurry mixture inside inner vessel 102.

Vibrating mechanism 106 can be attached directly to the exterior of outer vessel 104. In one embodiment, vibrating mechanism 106 is attached near the middle of outer vessel 104. In a further embodiment, vibrating mechanism 106 can be attached by compression clamps; this may allow vibrating mechanism 106 to be moved vertically along outer vessel 104. According to some modes of operation, the frequency of the vibrating mechanism 106 can be adjusted after moving vibrating mechanism 106 vertically along outer vessel 104 as different vibrating frequencies may be desirable at different points along the outer vessel 104, such as, for example, where different portions of outer vessel 104, inner vessel 102, or the vessel assembly 100 more generally, have different resonance frequencies.

According to some embodiments of the invention, the type of vibration may differ. That is, some vibrating mechanisms 106 may provide a linear reciprocating motion in one linear direction, while other vibrating mechanisms may provide a vibrating motion that can be linear reciprocating along two different directions, or two axes, which axes may be orthogonal. Alternatively, according to other variants of the invention, vibrating mechanism 106 may provide an elliptical motion to effect the vibration.

Embodiments can further comprise auger drive mechanism 108, which can be attached to the top of vessel assembly 100. Auger drive mechanism 108 can comprise auger 110 that may extend through inner vessel 102 through a top opening of inner vessel 102. In a further embodiment, auger 110 may extend through only a portion of inner vessel 102. Auger drive mechanism 108 may be speed controlled to adjust the discharge of the slurry mixture and/or the back pressure levels in inner vessel 102. That is, the speed of auger drive mechanism 108 may be controlled to increase or decrease the discharge of the slurry mixture to a desired level or to increase or decrease the pressure of the slurry mixture inside vessel 102, described in further detail below.

According to other embodiments, auger 110 may be replaced by other mechanisms for extracting the dried slurry. For example, vacuum mechanisms can be used, or drive wheels that frictionally engage or grip the ice or dried slurry to force the ice or dried slurry out of the top of the inner vessel 102. As described above, a pumping mechanism that operates to pass a slurry mixture into inner vessel 102 via inlet 112 may respond to the operation of other components of the apparatus. In an embodiment, auger 110 may operate to move dried slurry out of the top of inner vessel 102 causing the pressure of the slurry mixture inside inner vessel 102 to decrease and causing the pumping mechanism to respond by increasing the rate at which the slurry mixture is passed into inner vessel 102 so that the level of pressure is maintained at a level sufficient to force water out of the slurry mixture through perforations 114. In a further embodiment, the pumping mechanism may send instructions to auger drive mechanism 108 to adjust the speed of auger 110 so that a change in the level of pressure of the slurry mixture inside inner vessel 102 will result. For example, the pumping mechanism may send an instruction to auger drive mechanism 108 to stop auger 110 when the pressure of the slurry mixture inside inner vessel 102 is too low.

According to other embodiments, the slurry mixture may be washed or purified inside inner vessel 102 before it is discharged from inner vessel 102. Such washing may alter the characteristics of the slurry mixture being discharged. For example, injector nozzles (not shown) may be provided on the side of inner vessel 102. The injector nozzles may operate to supply a quantity of liquid (for example, fresh water) to wash the slurry mixture as it travels through inner vessel 102. The supply of liquid through injector nozzles may have the effect of washing away salt or other particles from the partially separated slurry mixture inside inner vessel 102. The resulting slurry mixture that is discharged thus contains a concentration of salts or other unwanted impurities that is lower than that of a slurry mixture that has not been washed prior to discharge. For example, an artificial snow-making apparatus that produces ice particles from a salt water brine may produce a snow mixture that contains residual salts that have a detrimental impact on the environment after the snow has melted (e.g. snow produced from a salt water brine for skiing events may contain a level of salt that is harmful to plant life in the future). The residual salt content may be reduced to a desired level (for example, 0.2% or 0.3%) prior to discharge by washing the slurry mixture inside inner vessel 102 prior to discharge from inner vessel 102. Furthermore, the vibration action provided by vibration mechanism 106 may assist in shaking the rinse water off of the slurry mixture quickly so that the ice particles in the slurry mixture are not melted prior to discharge from inner vessel 102.

The embodiments described above are merely examples and other configurations can be used.

Operation

In the described embodiment, the pumping mechanism can pump a slurry ice mixture through inlet 112 and into inner vessel 102 through the bottom opening of inner vessel 102. As additional slurry is pumped into inner vessel 102, the resulting increase in pressure may displace upwards the slurry within inner vessel 102.

The motor unit can drive vibrating mechanism 106, resulting in vibrations that are transmitted to vessel assembly 100, to cause inner vessel 102 and outer vessel 104 to vibrate.

Causing vessel assembly 100 to vibrate may provide several benefits to the process of concentrating slurry ice. First, the vibration may accelerate the natural gravity driven separation of the ice and water in the rising column of slurry ice. Second, the vibration may assist the water in migrating through perforations 114 of inner vessel 102 to outer vessel 104, where it is less likely to be impeded by ice from falling away for collection or disposal. Third, as the concentration of ice within inner vessel 102 increases, the vibration may increase the natural affinity of the ice to cluster together with itself, rather than cling to the walls of inner vessel 102 or pass through perforations 114 along with the water. Fourth, as the mixture in inner vessel 102 becomes less fluid, the coefficient of friction may increase, potentially making it more difficult to push the mixture upwards within inner vessel 102; the vibration may assist in overcoming the higher coefficient of static friction of the damp ice mass. Finally, the vibration may have the effect of removing final amounts of water that may remain in the centre of the ice mass by causing these final amounts to migrate to the outside edges of the ice mass; this may also aid in purifying the ice by removing other additives (such as salts and alcohols, for example) that may be contained in the slurry—the remaining ice may become purer solid $H_2O$. Optionally, and as described above, the compression clamps attaching the vibrating mechanism 106 to the exterior of outer vessel 104 can be adjusted to permit vibrating mechanism 106 to be moved along the length of outer vessel 104 to increase vibrations at specific points along this length to help address blockages at these points resulting from the higher coefficient of friction described above.

The remaining purer ice may be displaced upwards by the pressure created from the pumping of slurry into inner vessel 102. When the solid mass of ice within inner vessel 102 is sufficient to be moved away, auger drive mechanism 108 can drive auger 110, to provide further positive displacement of the purified ice so that it may be moved readily to desired applications with control of the feed speed and pressure output. The positive displacement of the purified ice by auger 110 may allow the slurry in-feed pressure to be lower: the in-feed pressure may not have to displace upwards all of the accumulating purer ice. Driving auger 110 may further increase the efficiency of separation by moving and mixing the slurry ice; without movement or mixing of the slurry ice, it may be more difficult to dry the slurry in the middle of the rising column. In one embodiment, auger drive mechanism 108 can continuously drive auger 110 throughout the separation process. In a further embodiment, the rate of rotation of auger 110 can be modulated by controlling auger drive mechanism 108. Modulating the rate of rotation may provide further control of the ice output speed and the slurry in-feed speed, which may provide additional control of the overall rate of passage through inner vessel 102 of the mass for separation.

The embodiments illustrated above are merely examples and other operations can be used.

Further Embodiments

In a further embodiment, the vibration amplitude and frequency created by vibrating mechanism 106 may be adjusted or tuned. Such adjusting may allow the vibration amplitude or frequency to match the optimal frequencies for various vessel sizes, as well as the various consistencies of slurry ice that may be fed into the apparatus. In one embodiment, moving vibrating mechanism 106 up or down along outer vessel 104 may allow the vibrations to be tuned to the natural frequencies of one or both of inner vessel 102 or outer vessel 104.

In a further embodiment, the natural frequencies of inner vessel 102 or inner vessel 104 may be modified by changing the number or location of mounting points 116.

In a further embodiment, a pressure differential may be applied between inner vessel 102 and outer vessel 104 through common means. In one embodiment, low pressure suction is added to outer vessel 104. In a further embodiment, air pressure can be applied through the top of inner vessel 102. Such pressure differentials may cause outer vessel 104 to be at a lower pressure than inner vessel 102; as the liquid portion may be more affected by such a pressure differential than the solid ice crystals, the pressure differential may assist the liquid portion of the slurry to migrate outwards and through perforations 114.

In the presence of a pressure differential between inner vessel 102 and outer vessel 104, using an elongated shape for perforations 114 may provide additional benefits. For example, as the ice dries out from the rising slurry, air may begin to pass through the ice crystal interstices and out of some of perforations 114. As the air flow may be restricted to a smaller opening by the ice or slurry rising/reaching the top of some of perforations 114, the air may flow through an orifice that may be decreasing in size; this may increase the velocity of the air which may assist in final drying stages by pushing out residual drops of liquids.

A further embodiment comprises a mount that can make the apparatus mobile. One embodiment may comprise a truck or trailer mount.

In a further embodiment, vessel assembly 100 may not include an outer vessel but may comprise a single vessel substantially similar to one of many possible embodiments of inner vessel 102. In such an embodiment, vibrating mechanism 106 may be attached through common means directly to the exterior of the single vessel. In a further embodiment, the single vessel may be open to the atmosphere (instead of being contained within any outer vessel).

Although the descriptions above contain many specificities, these should not be construed as limiting the scope of the embodiments but as merely providing illustrations of some of several embodiments. For example, according to other embodiments of the invention, outer vessel 104 and inner vessel 102, may be replaced with a single vessel to which vibrating mechanism 106 can be attached directly, which single vessel could also comprise perforations 114. In this embodiment, other liquid collecting components, instead of outer vessel 104, can be provided to collect the water or other liquid received via the perforations 114.

The invention claimed is:

1. An apparatus comprising
at least one vessel having an opening and an inlet, such that the opening is spaced from the inlet along a length of the at least one vessel;
a supplier operable to supply a slurry mixture through the inlet and into the at least one vessel, wherein the at least one vessel comprises a plurality of perforations dimensioned to receive a liquid flow from the slurry mixture to dry the slurry mixture;
a vibrator for imparting vibrations to the at least one vessel, the vibrator being attached to the at least one vessel; and
an extractor operable to extract the dried slurry mixture from the opening.

2. The apparatus as defined in claim 1 wherein
the at least one vessel comprises an inner vessel and an outer vessel,
the inner vessel comprises the opening and the inlet,
the outer vessel is attached to and adjoins at least a portion of the inner vessel, and
the portion of the inner vessel adjoining the outer vessel comprises the plurality of perforations dimensioned to provide the liquid flow from the slurry mixture within the inner vessel to a volume outside the inner vessel and enclosed by the outer vessel.

3. The apparatus as defined in claim 1 wherein the inner vessel and the outer vessel are substantially vertically oriented such that the opening is substantially above the inlet.

4. The apparatus as defined in claim 3 wherein the plurality of perforations are a plurality of slits.

5. The apparatus as defined in claim 3 wherein the plurality of perforations vary in size along the length of the inner vessel.

6. The apparatus as defined in claim 5 wherein the plurality of perforations are larger toward the opening and are smaller toward the inlet.

7. The apparatus as defined in claim 4 wherein each perforation in the plurality of perforations has a perforation width of between 0.005 inches and 0.06 inches and a perforation length of between 0.005 inches and 5 inches.

8. The apparatus as defined in claim 2 wherein the outer vessel is attached to the inner vessel by a plurality of mounts, each mount having a curved or inclined upward facing surface to impede ice buildup on the curved or inclined upward facing surface.

9. The apparatus as defined in claim 1 wherein the extractor comprises an auger extending into the at least one vessel via the opening, and an auger driver for driving the auger to extract the dried slurry mixture from the opening.

10. The apparatus as defined in claim 1 wherein the vibrator is adjustably attached to the at least one vessel such that the vibrator can be moved along the length of the at least one vessel.

11. The apparatus as defined in claim 1 wherein the vibrator comprises a frequency controller configured to control and adjust a frequency of the vibrator.

12. A method comprising:
providing a slurry mixture comprising a material in a melted liquid form and in a solid frozen form;
forcing the slurry mixture through an inlet into a vessel and through the vessel to an opening, wherein the vessel comprises a plurality of perforations dimensioned to receive a liquid flow from the slurry mixture to dry the slurry mixture;

vibrating the vessel and the slurry mixture within the vessel to shake the material in the melted liquid form out through the plurality of perforations to dry the slurry mixture; and, extracting the dried slurry mixture from the opening.

13. The method as defined in claim 12 further comprising, before forcing the slurry mixture through the inlet into the vessel, orienting the vessel such that the opening is substantially above the inlet.

14. The method as defined in claim 12 further comprising adjusting a frequency for vibrating the vessel when the slurry mixture is being forced through the vessel.

15. The method as defined in claim 12 wherein vibrating the vessel and the slurry mixture within the vessel comprises attaching a vibrator to the vessel at a selected point, and the method further comprises adjusting a location of the selected point along a length of the vessel to change the location where vibration is imparted to the vessel and the slurry mixture within the vessel.

* * * * *